Patented Aug. 13, 1935

2,010,800

UNITED STATES PATENT OFFICE 2,010,800

COMPOSITION FOR CLEANING OIL WELLS

Edward Maurice Adams, Lexington, Ky., and Wilmer Charles Gangloff and Grace G. Spencer, Cincinnati, Ohio, assignors to The Drackett Chemical Company, Cincinnati, Ohio, a corporation of Ohio No Drawing. Application March 16, 1932, Serial No. 599,348

3 Claims. (Cl. 87—5)

The present invention relates to a composition suitable for the cleaning of oil wells, and the like of paraffin, asphaltic and similar obstructing coatings through the agency of exothermic heating and pressure and has for its object the provision of such a composition as will be free of the dangers and disadvantages heretofore known in this general type of cleaning, namely, too rapid reaction on contact with moisture and difficulty in satisfactory transportation.

Another object of the invention is to provide a composition whereby it is possible to provide a higher temperature in a localized area than attainable with hitherto known agencies for the purpose and to furthermore effect such a composition in a form that is relatively free of danger of painful injury to workmen.

Another object is to provide a composition which is easily and safely applied and which is more effective than hitherto used compositions.

These and other objects are attained by the hereinafter fully explained composition.

Our invention consists broadly in a composition which comprises an alkali metal hydroxide, an oxidizing agent, and a substance capable of reacting therewith in the presence of water to produce localized heating and localized pressure from the gases formed in the reaction, all held in a fluid carrier which retains them in a protected state, thus preserving them against rapid reaction with small quantities of moisture and rendering them at once safe to handle and easy to place in the desired points of application.

The carrier or fluid vehicle is a substantially water-free oil, preferably water-free crude mineral oil or derivative thereof, which shall preferably be of sufficient fluidity under the normal temperature conditions encountered that the mix may flow by gravity into the oil well either directly, from a suitable bottom discharge type of agency, or through an inserted tube or pipe which may be smaller than the diameter of the well. This substance, when deposited in the location of the paraffin, asphalt or other obstructing coating of an oil well at the producing sand will sometimes encounter sufficient water to initiate exothermic reaction, or water may easily be added to the deposit of the composition of the invention, the oil carrier readily separating and leaving the water for a full and intense reaction with the remaining components of the composition.

We preferably employ as the hydroxide, a caustic soda or a caustic potash comminuted to pass through a ten mesh screen since this very small size is well adapted to passage through small tubes and the like in the fluid mass formation. It is to be understood, however, that the size of the alkali metal hydroxide particles will be governed principally by the necessity for flowing the composition mass and, to a slight degree, by the natural aversion of operators to placing larger bodies in the bore.

It will be understood that the alkali metal hydroxide may be that of one of the alkali earth metals if desired, the caustic soda being preferable however on account of its cheapness and its ready availability on the open market.

For the oxidizing agent we prefer to use alkali metal nitrate, such as sodium nitrate, of the crystallized commercial type or the spray dried globular type either of which should also be suitably comminuted.

The substance employed which is capable of reacting with alkali metal hydroxide and oxidizing agent in the presence of water and oil is preferably comminuted aluminum metal.

The oil is preferably a water-free crude mineral oil or its derivative having a suitable pourpoint and viscosity, e. g., pourpoint 5° F., viscosity, 52 Saybolt seconds at 70° F.

We have found that the proportions of the above ingredients which will give highly satisfactory results are approximately as follows. It will be understood, however, that these are subject to some variation and that they are given by way of preferred example.

Parts by weight
Alkali metal hydroxide (e. g. sodium hydroxide) _____ 80
Alakli metal nitrate (e. g. sodium nitrate) ___ 10
Substance reactive with above materials in water (e. g. comminuted aluminum metal)_ 10
Oil (e. g. water-free crude mineral oil, pourpoint 5° F., viscosity 52 Saybolt seconds at 70° F.) _____ 15

The composition of the aforementioned mixture is ideally packed in metal containers so that it may be advantageously transported. When used in oil well work it can be pumped with oil directly to the desired location or poured in place, the quantity used in a given location being governed by the diameter of the well and the thickness of the oil bearing sand or strata. It has been found that this composition is capable of being handled with safety by unskilled workmen and that as soon as the charge is placed it may be set into action by adding water in proportions of one or more barrels of water to one hundred (100) pounds of the composition. The exothermical action provides a very high temperature in a localized area accompanied by localized pressure from the gas formed. The paraffin and/or asphaltic deposits are effectively removed by the reaction and reduced to a liquefied state and may be pumped out with the crude oil after the reaction has subsided. The water alkali mix is normally lost by seepage into the bottom of the well after reaction but may also be pumped out if not so dissipated. It will be appreciated that there are no deleterious conditions existing in the well after the reaction which would damage the casings. It is to be understood that the tubing when present is pulled during the cleaning operation and then returned to position.

The use of the composition of our invention is not attended by the usual necessity for the laborious type of cleaning which usually follows the "shooting" as by detonating a charge of nitroglycerin. Likewise, there is eliminated the danger of destroying the well which attends the last mentioned form of cleaning.

Among the advantages derived from the use of oil as an addition to the dry mixture, are the facts that it may be placed in a desired position with less waste of material through adhesion to the casing or sides of the well than is possible with a dry compound. It may also be introduced through small pipes without danger where a dry compound would bridge across and interrupt communication. The compound of the present invention also avoids the danger attendant the blowing about of the dry powders and the settling on the skin and in the eyes of operatives. The oil also prevents deliquescense of the alkali and caking of the compounds as well as carbonation of the alkali and a reduction of its efficiency. The possibility of crystallization of alkali through the addition of an insufficient amount of water is also minimized. By the addition of oil it is also possible to handle the compound with pumps and with mixers of the jet type. The composition also admits of variable technique in the application of water and is in all respects a much safer compound for handling by unskilled labor.

What is claimed is:

1. A heat and pressure producing composition for use in cleaning oil wells of paraffin and asphaltic compound obstructions, consisting of an alkali metal hydroxide 80 parts by weight, an alkali metal nitrate 10 parts by weight, a metal, such as aluminum, capable of reaction in the presence of water with the foregoing materials 10 parts by weight, and substantially water-free mineral oil 15 parts by weight.

2. A heat and pressure producing composition for use in cleaning oil wells of paraffin and asphaltic compound obstructions, consisting of sodium hydroxide 80 parts by weight, sodium nitrate 10 parts by weight, a metal such as aluminum capable of reaction with the foregoing materials in the presence of water 10 parts by weight and substantially water-free mineral oil 15 parts by weight.

3. A composition for introduction into oil wells for cleaning the same of paraffin and asphaltic compounds when water is subsequently added, consisting of a pourable mixture of alkali metal hydroxide approximately 80 parts by weight, an alkali metal nitrate approximately 10 parts by weight, a metal, such as aluminum which is capable of reaction with the foregoing in the presence of water approximately 10 parts by weight and a water-free mineral oil approximately 15 parts by weight.

EDWARD MAURICE ADAMS.
WILMER CHARLES GANGLOFF.
GRACE G. SPENCER.